US012363472B2

(12) United States Patent
Peace et al.

(10) Patent No.: US 12,363,472 B2
(45) Date of Patent: Jul. 15, 2025

(54) ACOUSTIC PORT FOR A PLAYBACK DEVICE

(71) Applicant: Sonos, Inc., Santa Barbara, CA (US)

(72) Inventors: Paul Peace, Boston, MA (US); Charles LaColla, Woodland Hills, CA (US); Wei Yang, Boston, MA (US); Briet Louise Brown, Boston, MA (US); Thomas Dubrowski, Middleboro, MA (US); Nathaniel Shankute, Santa Barbara, CA (US); Greg Tracy, Goleta, CA (US); Anthony Ferraro, Somerville, MA (US); Samuel Feine, Quincy, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 17/648,282

(22) Filed: Jan. 18, 2022

(65) Prior Publication Data

US 2022/0232313 A1 Jul. 21, 2022

Related U.S. Application Data

(60) Provisional application No. 63/199,716, filed on Jan. 19, 2021.

(51) Int. Cl.
*H04R 1/28* (2006.01)
*H04R 1/24* (2006.01)

(52) U.S. Cl.
CPC ............. *H04R 1/2849* (2013.01); *H04R 1/24* (2013.01); *H04R 1/2857* (2013.01)

(58) Field of Classification Search
CPC ....... H04R 1/2849; H04R 1/24; H04R 1/2857
USPC .......................................................... 381/345
See application file for complete search history.

(56) References Cited

U.S. PATENT DOCUMENTS

| | | | | | |
|---|---|---|---|---|---|
| RE20,175 | E | * | 11/1936 | Vanorio | F24H 9/0042 122/23 |
| 2,483,737 | A | * | 10/1949 | Parrish | F23D 11/00 431/190 |
| 2,810,448 | A | | 10/1957 | Dijck et al. | |
| 5,440,644 | A | | 8/1995 | Farinelli et al. | |
| 5,761,320 | A | | 6/1998 | Farinelli et al. | |
| 5,923,902 | A | | 7/1999 | Inagaki | |

(Continued)

FOREIGN PATENT DOCUMENTS

| | | | |
|---|---|---|---|
| EP | 1389853 | A1 | 2/2004 |
| WO | 200153994 | | 7/2001 |
| WO | 2003093950 | A2 | 11/2003 |

OTHER PUBLICATIONS

Audio Tron Quick Start Guide, Version 1.0, Mar. 2001, 24 pages.

(Continued)

*Primary Examiner* — Sean H Nguyen
(74) *Attorney, Agent, or Firm* — Fortem IP LLP

(57) ABSTRACT

A playback device includes a housing defining an acoustic volume therein, one or more audio transducers disposed at least partially within the housing, and an acoustic port extending through the housing. The acoustic port includes a wall defining a first aperture, a second aperture, and a passageway extending therebetween. The wall is at least partially curved along an axial direction, and a plurality of vanes coupled to the wall extend into the passageway such that the vanes define a plurality of channels extending axially within the passageway.

16 Claims, 14 Drawing Sheets

(56) References Cited

U.S. PATENT DOCUMENTS

| | | | | |
|---|---|---|---|---|
| 6,032,202 | A | 2/2000 | Lea et al. | |
| 6,256,554 | B1 | 7/2001 | Dilorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 9,049,517 | B2 * | 6/2015 | Chick | H04R 1/2857 |
| 10,397,694 | B1 * | 8/2019 | Chamness | B60T 13/686 |
| 10,531,183 | B2 * | 1/2020 | Halley | H04R 1/24 |
| 10,555,072 | B2 * | 2/2020 | Voishvillo | H04R 1/30 |
| 11,509,997 | B2 * | 11/2022 | Halley | H04R 1/025 |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2007/0142944 | A1 | 6/2007 | Goldberg et al. | |
| 2019/0320257 | A1 | 10/2019 | Dyreby | |

OTHER PUBLICATIONS

Audio Tron Reference Manual, Version 3.0, May 2002, 70 pages.

Audio Tron Setup Guide, Version 3.0, May 2002, 38 pages.

Bluetooth. "Specification of the Bluetooth System: The ad hoc SCATTERNET for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

International Search Report and Written Opinion mailed May 10, 2022; International Application No. PCT/US2022/070235; 13 pages.

International Preliminary Report on Patentability dated Jul. 20, 2023; International Application No. PCT/US2022/070235; 10 pages.

International Bureau, International Preliminary Report on Patentability, mailed on Aug. 3, 2023, issued in connection with International Application No. PCT/US2022/070235, filed on Jan. 18, 2022, 10 pages.

Non-Final Office Action mailed on May 30, 2024, issued in connection with U.S. Appl. No. 17/648,282, filed Jan. 18, 2022, 7 pages.

Non-Final Office Action mailed on Oct. 5, 2023, issued in connection with U.S. Appl. No. 17/648,282, filed Jan. 18, 2022, 7 pages.

Notice of Allowance mailed on Jan. 10, 2024, issued in connection with U.S. Appl. No. 17/648,282, filed Jan. 18, 2022, 9 pages.

* cited by examiner

ACOUSTIC PORT FOR A PLAYBACK DEVICE

CROSS-REFERENCE TO RELATED APPLICATION

This application claims priority to U.S. Patent Application No. 63/199,716, filed Jan. 19, 2021, which is incorporated herein by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
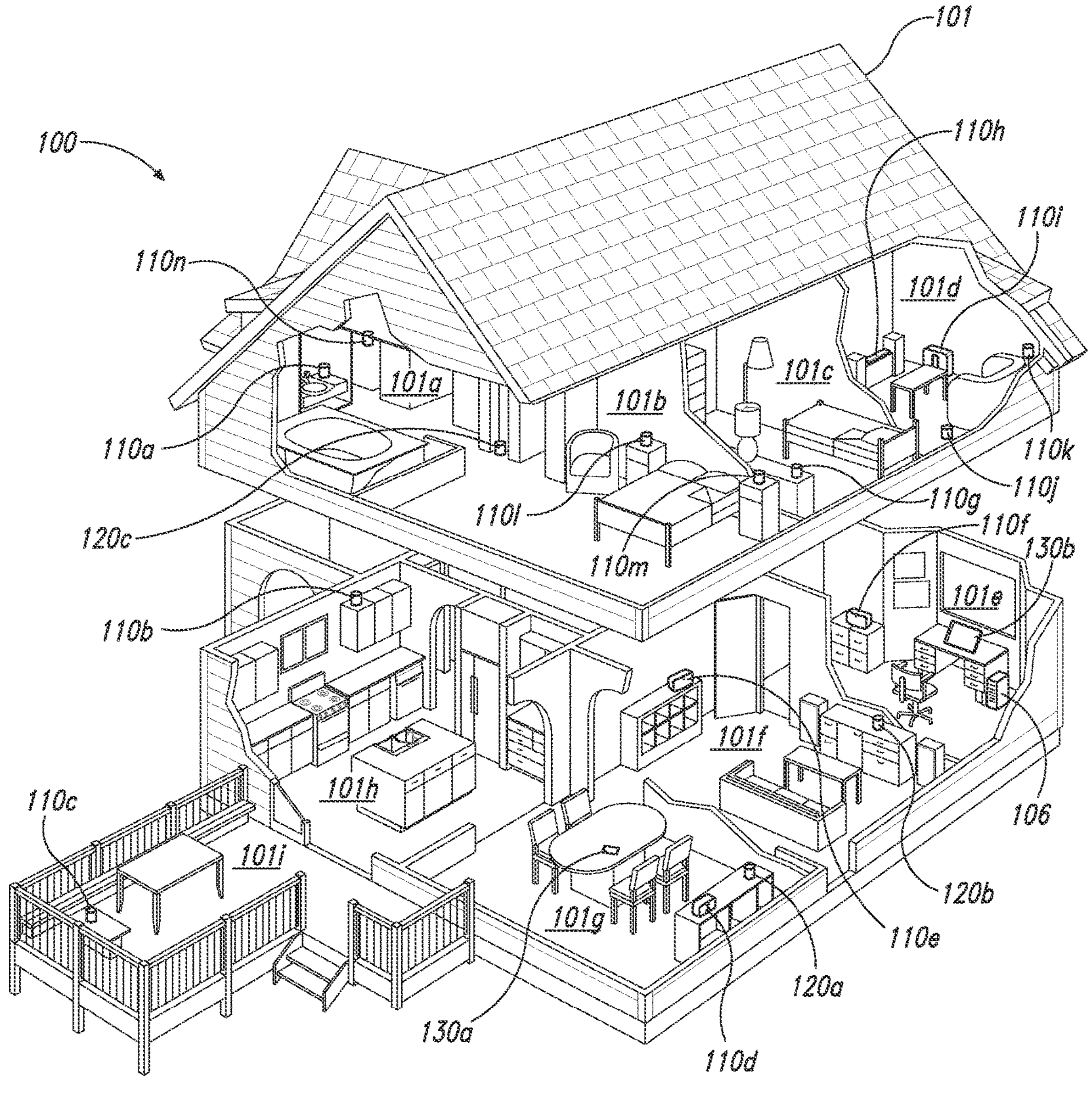
FIG. 1A is a partial cutaway view of an environment having a media playback system configured in accordance with examples of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Conventional playback devices can include an enclosure with an acoustic port, such as a bass reflex port. These ports can take the form of tube-like structures coupled to the enclosure, with a first end that opens to the exterior of the enclosure and a second opening that opens to the interior volume of the enclosure. As a result, the interior volume of the enclosure is fluidically coupled with the exterior environment via the port. During audio playback, air can oscillate between moving into the enclosure through the port and out of the enclosure through the port based on movement of the transducer(s) of the playback device. This oscillation can have a resonant frequency that depends on the effective length and cross-sectional area of the port and the interior volume of the enclosure. By tailoring the resonant frequency to a desired value, the bass playback of the playback device can be augmented, for example by increasing the bass response, lowering a frequency range of the bass response, and/or improving the efficiency of playback of bass content.

Conventional acoustic ports often have a straight tubular design. While this design is simple, the straight and tube-like design of the port may not be practical for all playback devices. For example, in playback devices with a relatively compact form-factor, such as a soundbar, a bass reflex port with a straight tubular design may be too large to fit within the playback device. Moreover, using an improperly sized port (e.g., having an effective length and/or cross-sectional area that are not suitable for the particular playback device) can result in undesirable noise and poor bass response. As such, acoustic ports cannot simply be scaled down to fit within smaller enclosures without adversely affecting acoustic performance. Accordingly, bass reflex ports are usually reserved for use in playback devices that are large enough in size to accommodate a straight port having the appropriate dimensions (e.g., length and cross-sectional area).

Examples of the present technology provide a bass reflex port that can be used even in playback devices having a smaller form-factor. For example, the bass reflex port can have its overall shape modified from a straight configuration to a curved or bent shape. A curved shape allows for the bass reflex port to have the same key dimensions as a properly sized bass reflex port (e.g., cross-sectional area, volume, effective length) while being amenable to fitting within a more compact enclosure than a straight tube-like design. This compact size allows for the bass reflex port to fit into playback devices with different form-factors, such as a soundbar, while still being tuned properly for the playback device.

Utilizing a curved bass reflex port can present some drawbacks, however. Under ideal conditions, air flow within a port is substantially laminar. However, air flowing within the curved port can become turbulent and non-uniform, which can create unwanted noise within the playback device. To reduce, minimize, and/or eliminate this noise, a curved bass reflex port can include one or more vanes positioned within the port. These vanes can divide the bass reflex port into one or more channels, which allows for the air flow through the channels to be more uniform and exhibit laminar flow characteristics. With the air exhibiting uniform, laminar, or both uniform and laminar flow characteristics, the unwanted noise caused by the curvature of the port can be reduced, minimized, or eliminated. As such, the present technology provides an acoustic port that is suitable for use in relatively compact playback devices while reducing the noise that otherwise accompanies curved acoustic ports.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom

101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
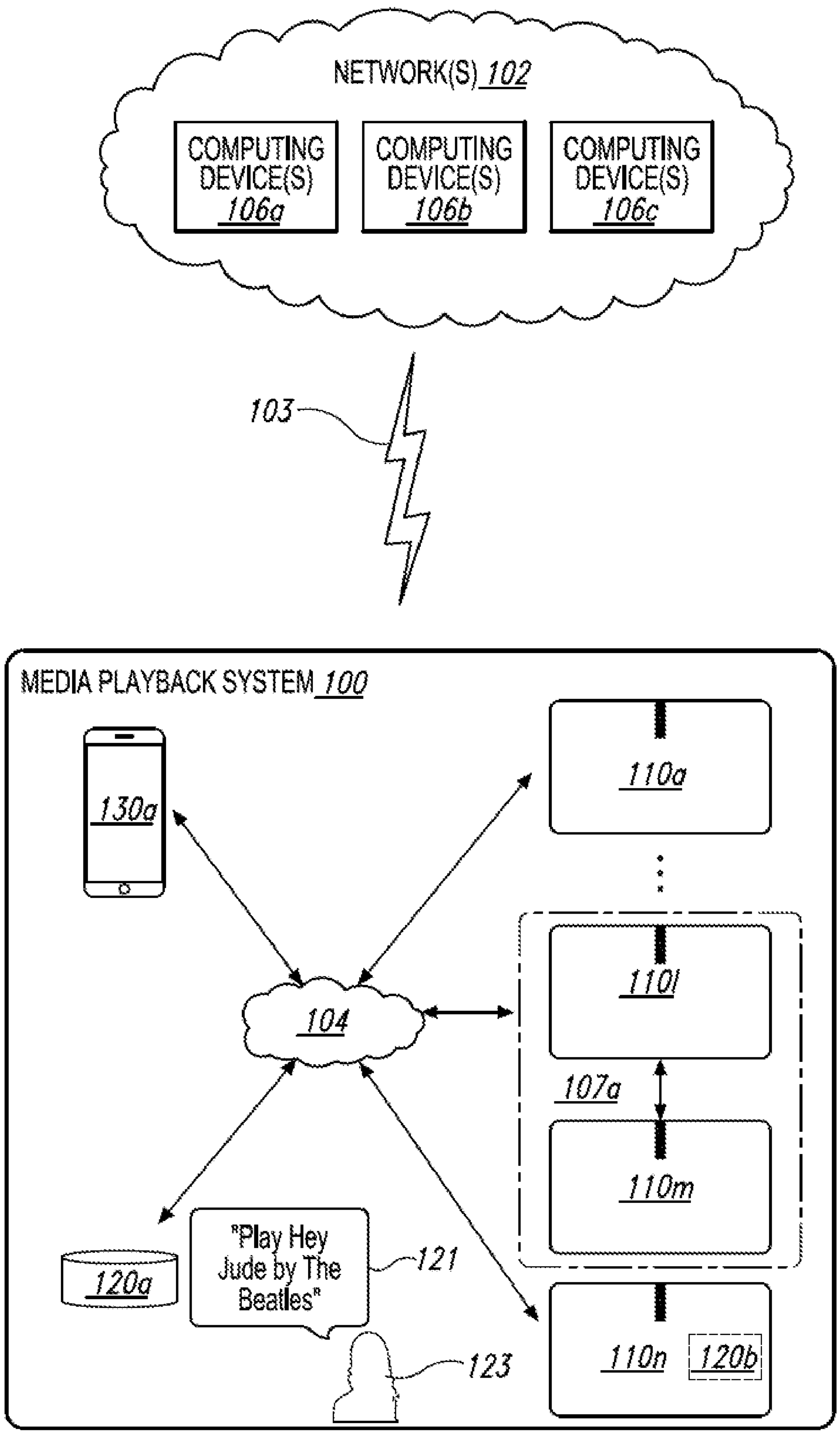
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
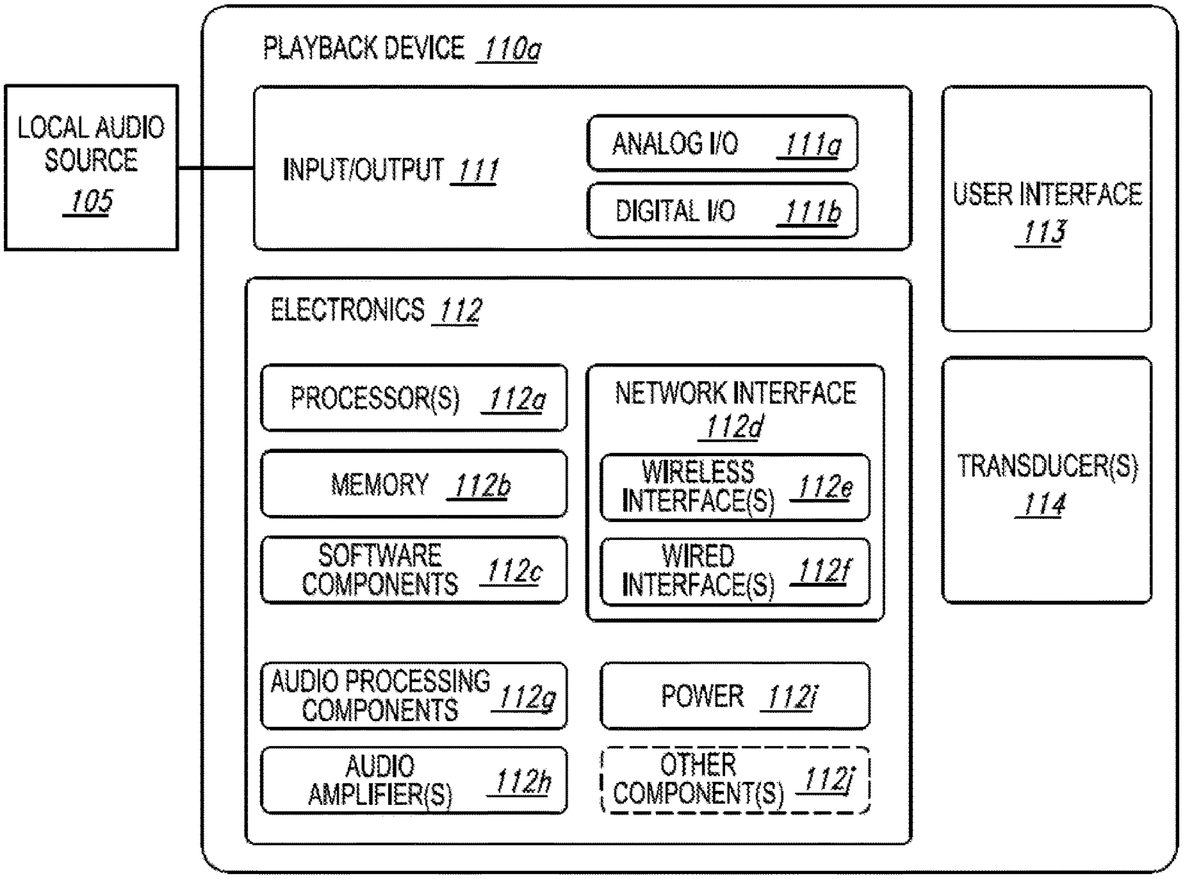
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, for instance, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
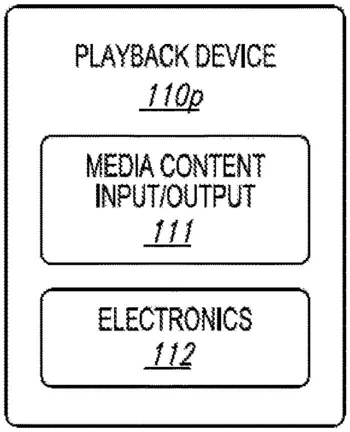
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for example, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
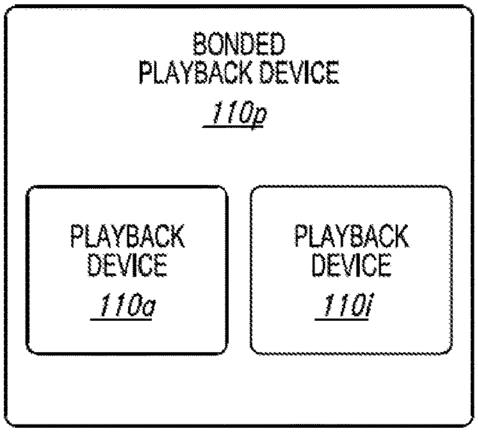
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
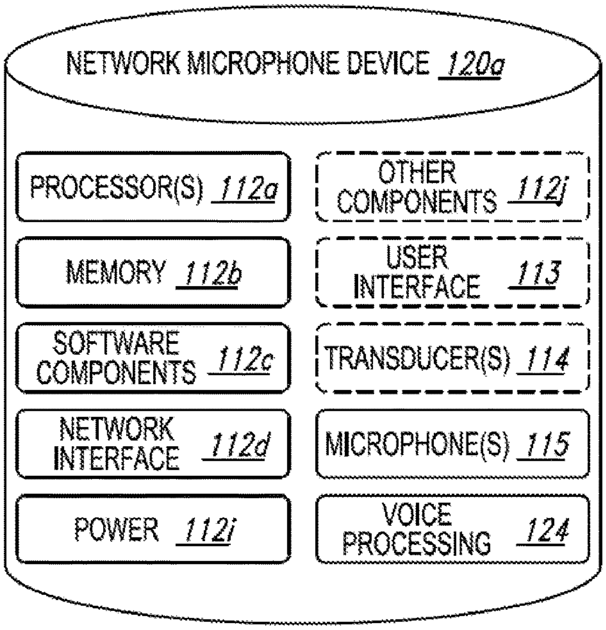
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
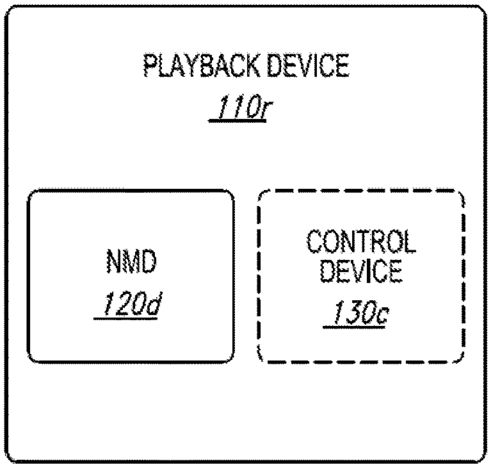
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
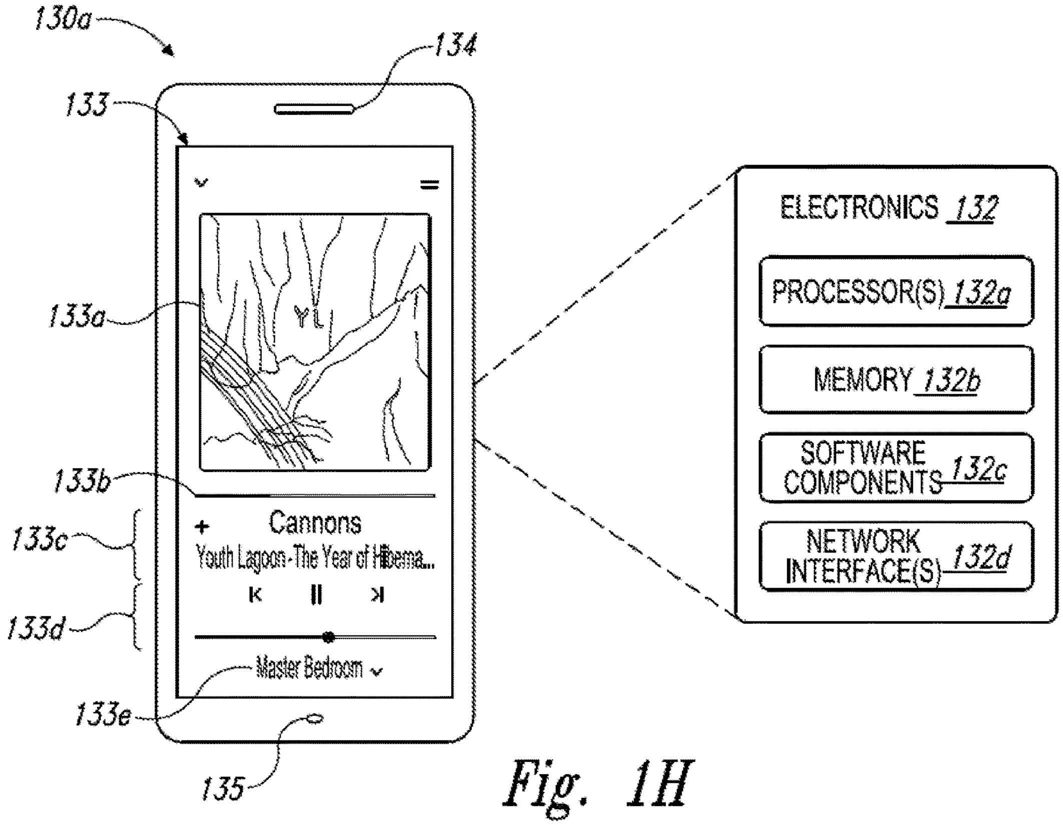
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 1 control of the media playback system 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, for instance, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices

Figure 2A:
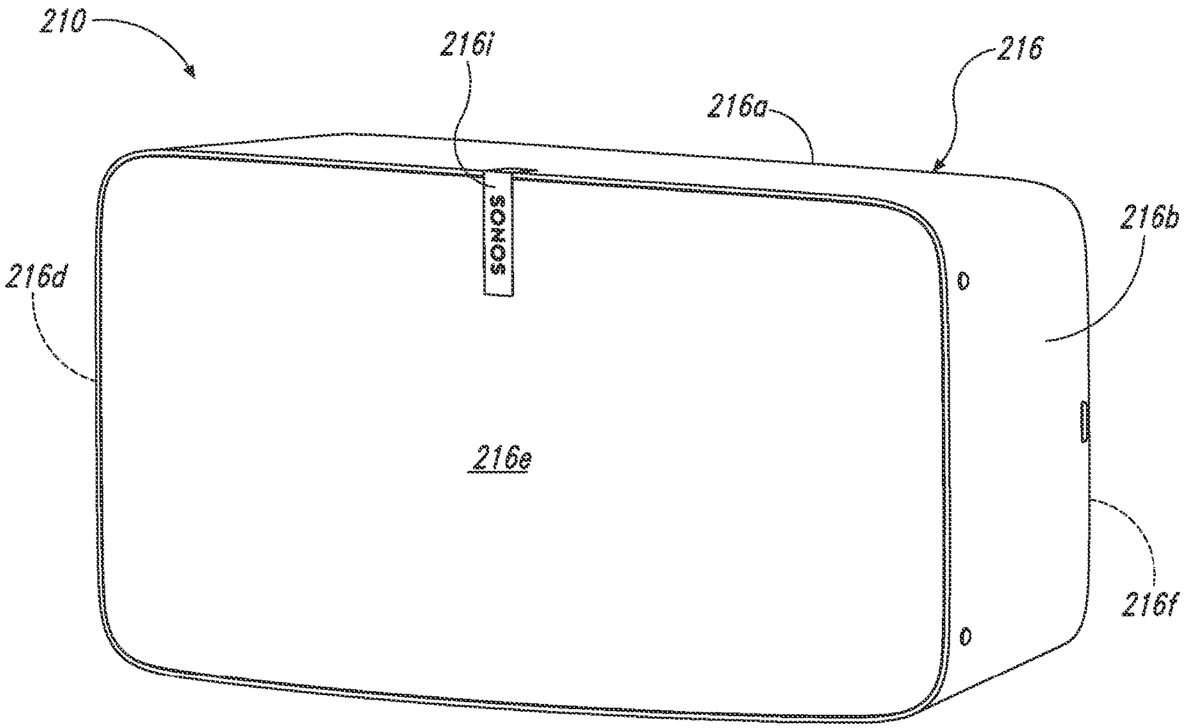
FIG. 2A is a front isometric view of a playback device configured in accordance with examples of the disclosed technology.
Figure 2B:
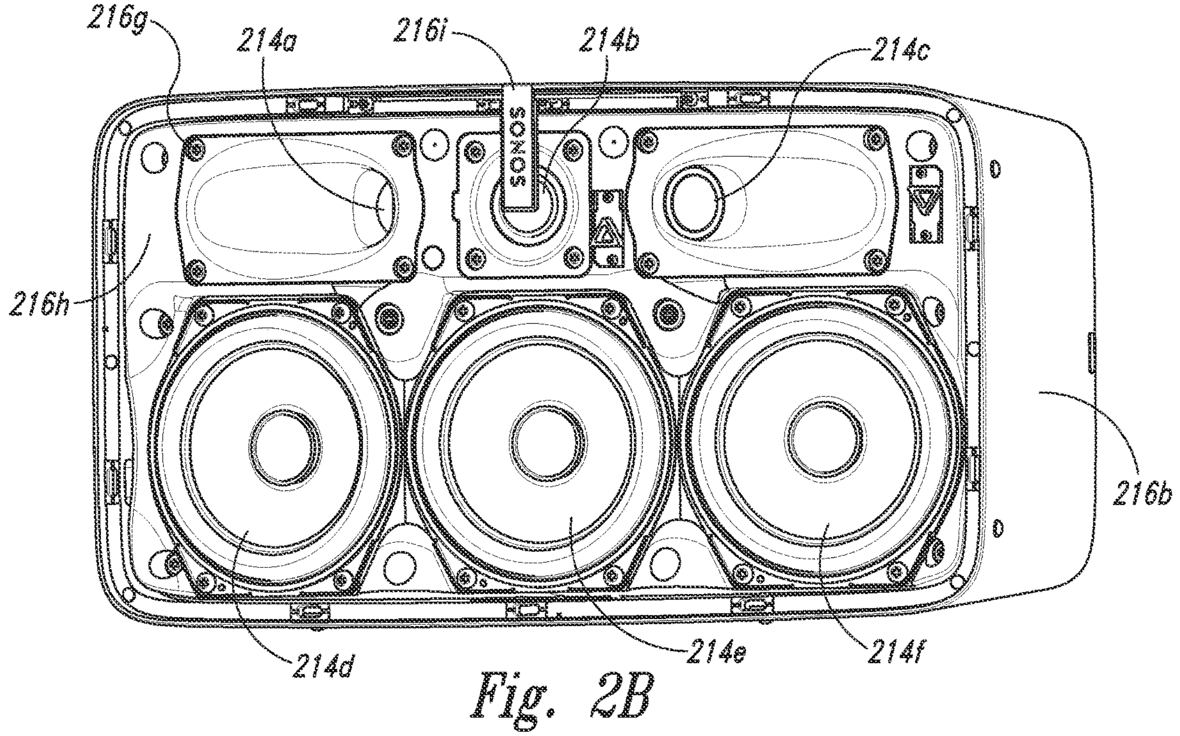
FIG. 2B is a front isometric view of the playback device of FIG. 3A without a grille.
Figure 2C:
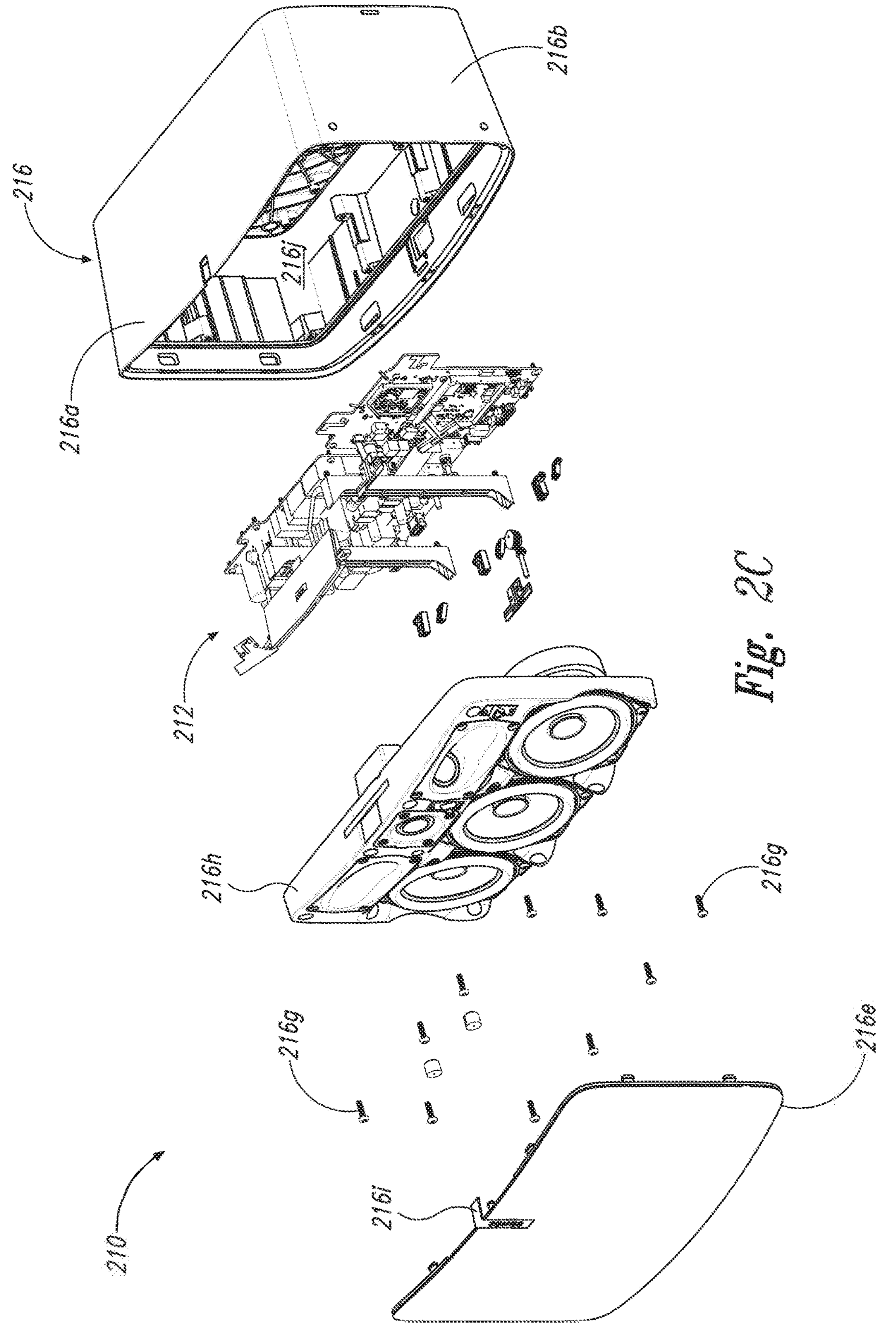
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214.

Figure 3A:
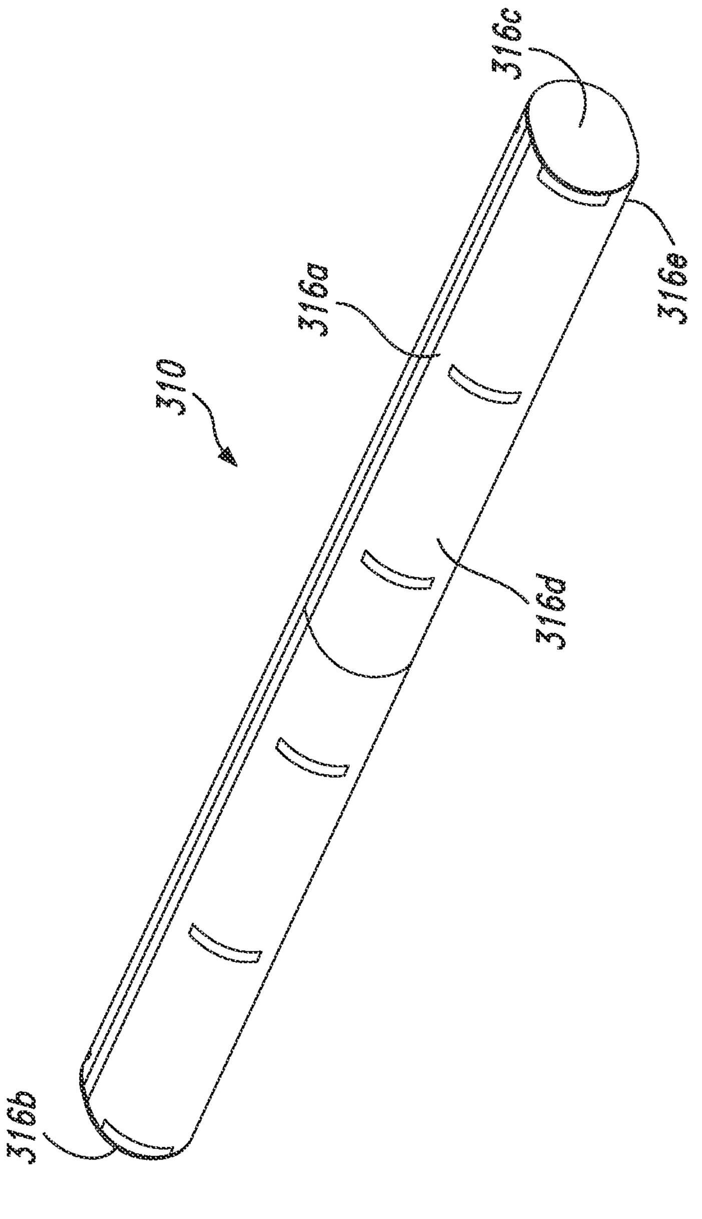
FIG. 3A is a perspective view of a playback device configured in accordance with examples of the disclosed technology.
Figure 3B:
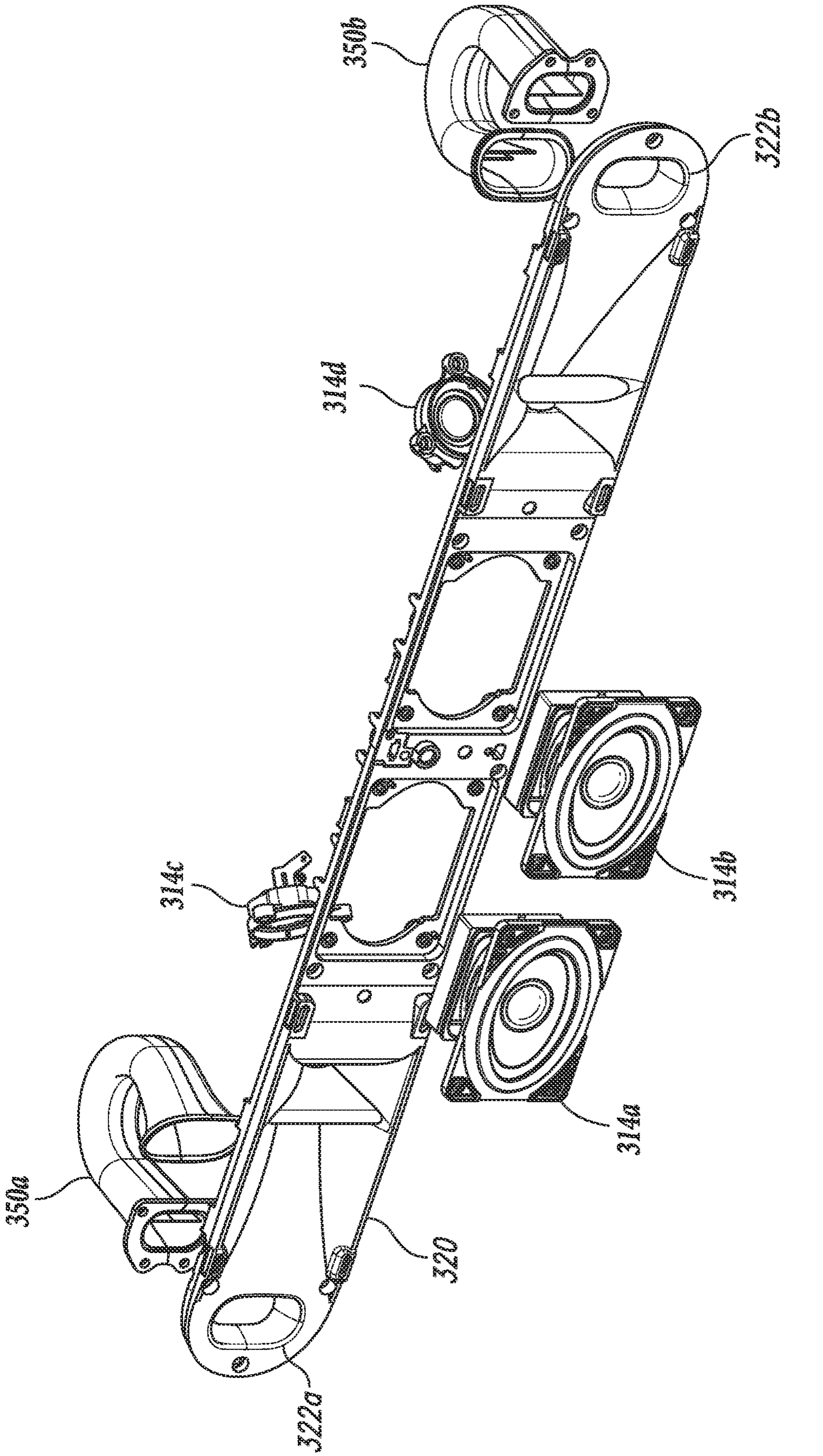
FIG. 3B is an exploded view of the playback device of FIG. 3A with some components hidden.
Figure 3C:
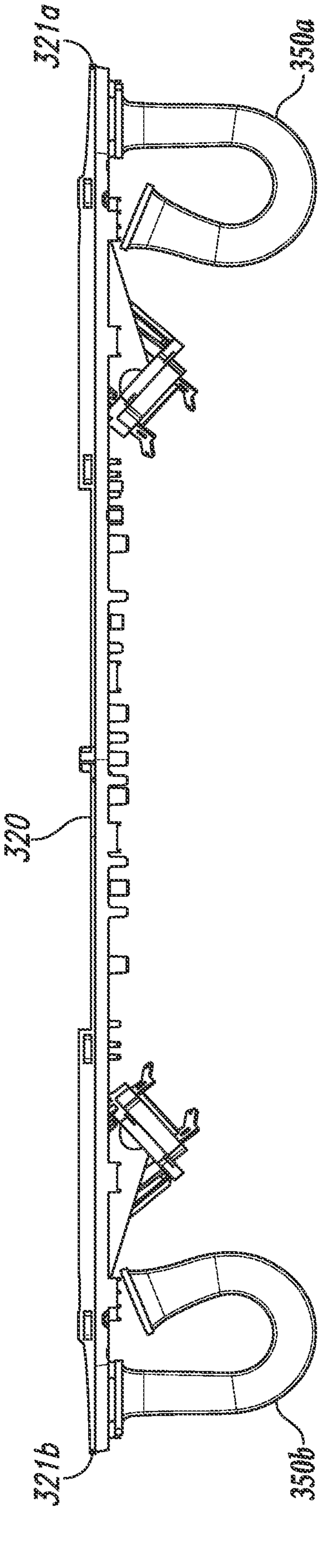
FIG. 3C a top view of the playback device of FIG. 3A with some components hidden.

FIG. 3A is a perspective view of a playback device 310, FIG. 3B shows the playback device 310 in an exploded view with some components hidden for clarity, and FIG. 3C shows a top view of the playback device 310 with some components hidden for clarity. The playback device 310 includes a body defined by housing 316, which is elongated along a longitudinal axis. The housing 316 defines an interior volume therein, and includes an upper portion 316*a*, a first side or left portion 316*b*, an opposing second side or right portion 316*c*, and a forward portion 316*d*, and a lower portion 316*e*. In some examples, the housing 316 can define a curved surface, for instance, with a curved transition between the upper portion 316*a* and the forward portion 316*d*, and/or with a curved transition between the forward portion 316*d* and the lower portion 316*e*. Such curved profiles can be particularly desirable from a design perspective, as the human eye tends to perceive objects with curved profiles as occupying a smaller volume. As such, a soundbar or other such playback device can appear smaller and more discreet by employing curved transitions along the outer surface.

As shown in FIG. 3B, a frame 320 can be positioned within the housing 316. The frame 320 can define a plurality of openings configured to receive one or more transducers 314*a-d* (collectively "transducers 314") therein. For example, the frame 320 can couple to transducers 314*a*, 314*b*, 314*c* and 314*d*. The transducers 314 coupled to the frame 320 and disposed within the housing 316 can be similar or identical to any one of the transducers 214*a-f* described previously.

The playback device 310 can include one or more acoustic ports 350*a* and 350*b* (collectively "acoustic ports 350"). In various examples, a port can take the form of a conduit, duct, tube, or any other suitable structure. In some examples, the acoustic ports 350 can be a bass reflex port. The acoustic ports 350 can allow for air to flow through from outside of the playback device 310 to the internal volume of the playback device 310. The acoustic ports 350 can be tuned to have a specific resonant frequency. For example, the internal volume of the playback device 310, the effective length of the acoustic ports 350, and the cross-sectional area of the acoustic ports 350 can be adjusted so that the air within the acoustic ports 350 resonates at a particular frequency or a particular range of frequencies. In various examples, the acoustic port 350 can have a curved profile so that at least part of the flow path is non-linear. For example, the acoustic ports 350 can have a "U" or "J" shape. The frame 320 can define a plurality of openings to receive the acoustic ports 350. For example, the acoustic port 350*a* can couple to the first aperture 322*a* near the right end 321*a* of the frame 320, and the acoustic port 350*b* can couple to the second aperture 322*b* near the left end 321*b* of frame 320.

In some examples, the playback device 310 takes the form of a soundbar that is elongated along the length of the playback device 310 and is configured to face a primary sound axis that is substantially orthogonal to the length of the playback device 310. In various examples, the playback device 310 has other forms, for instance, having more or fewer transducers, having other form-factors, having more or fewer acoustic ports, and/or having any other suitable modifications with respect to the example shown in FIGS. 3A-C.

Figure 4A:
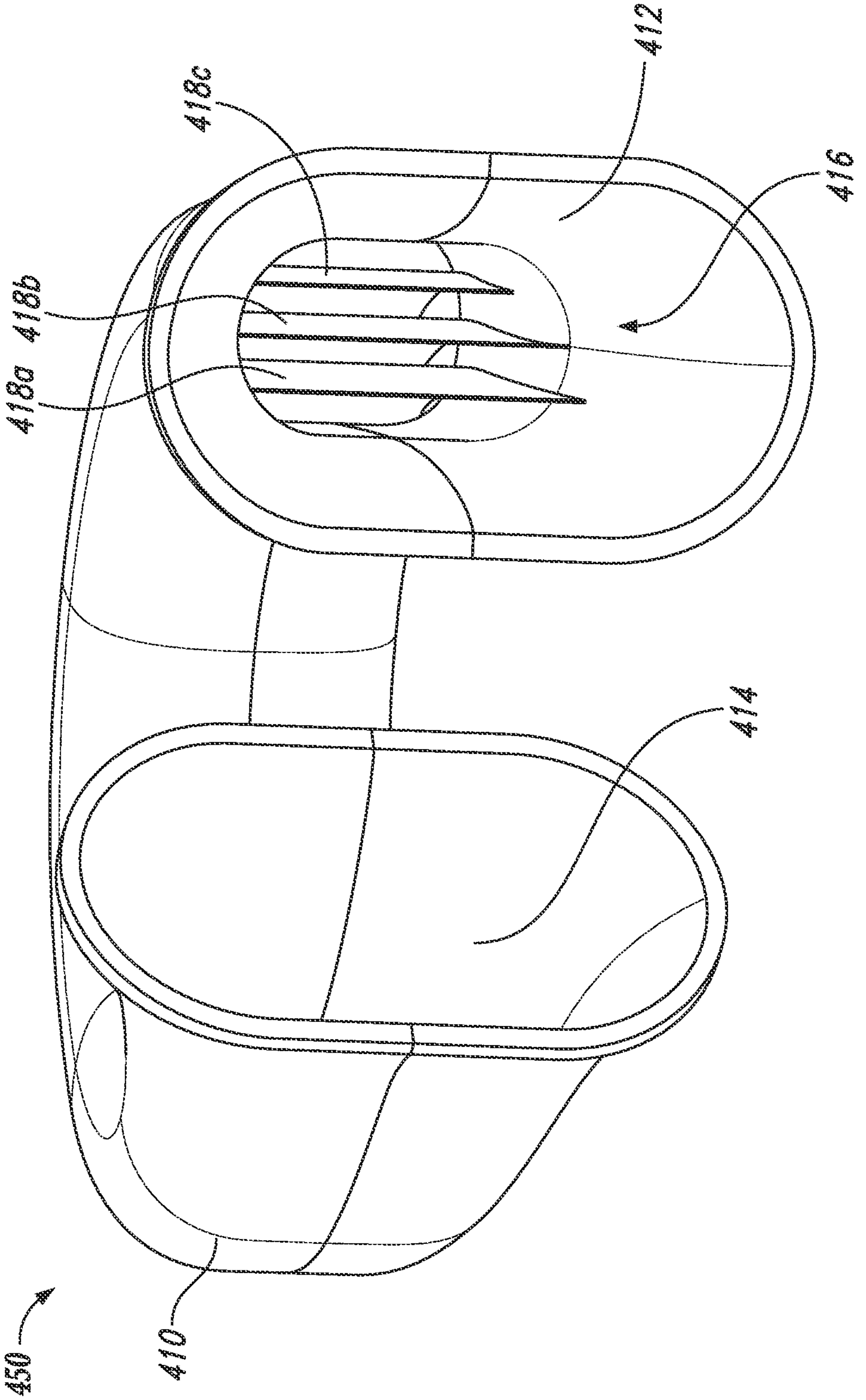
FIG. 4A is a front isometric view of an acoustic port in accordance with examples of the disclosed technology.
Figure 4B:
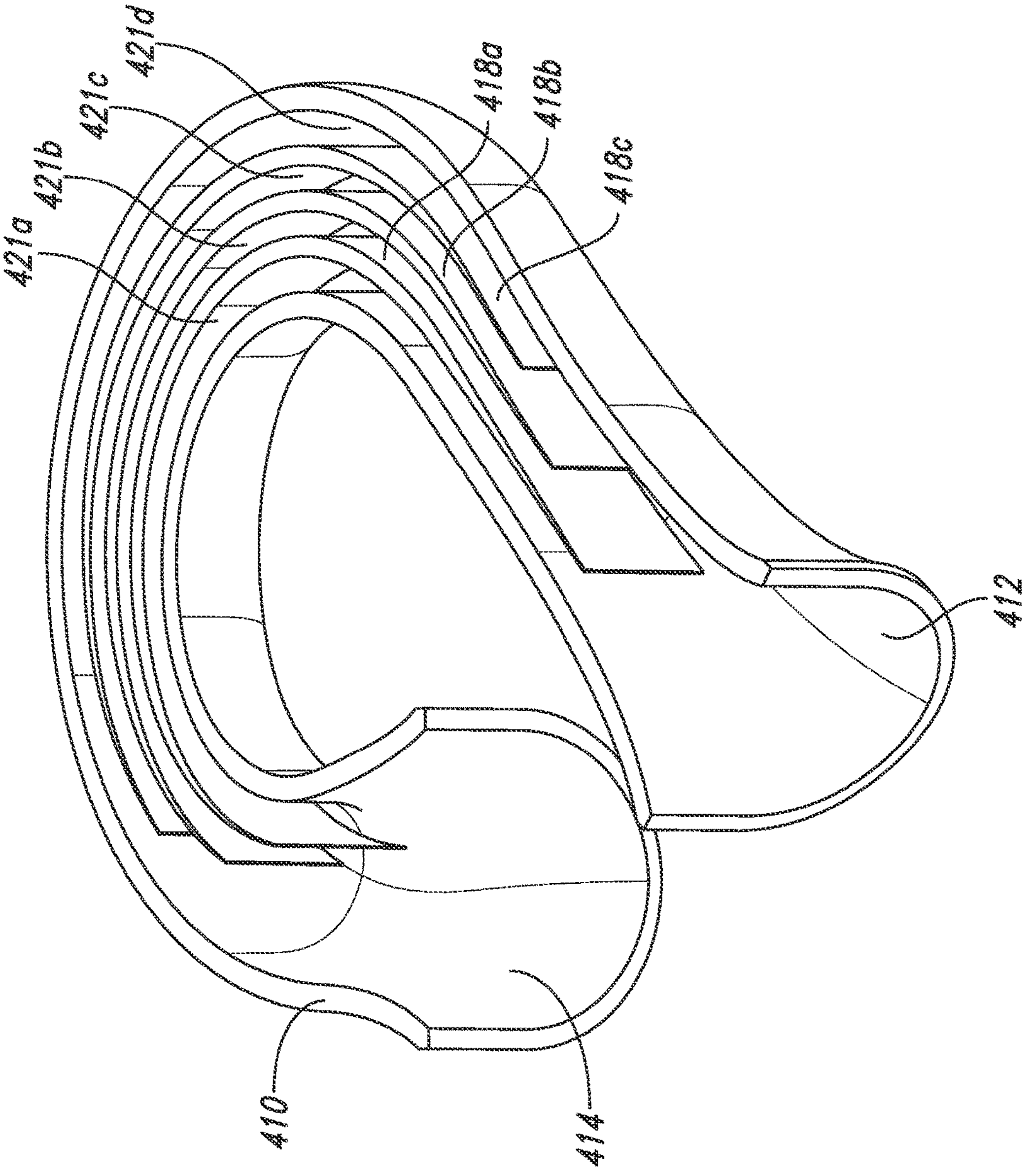
FIG. 4B is an isometric sectional view of the acoustic port from FIG. 4A
Figure 4C:
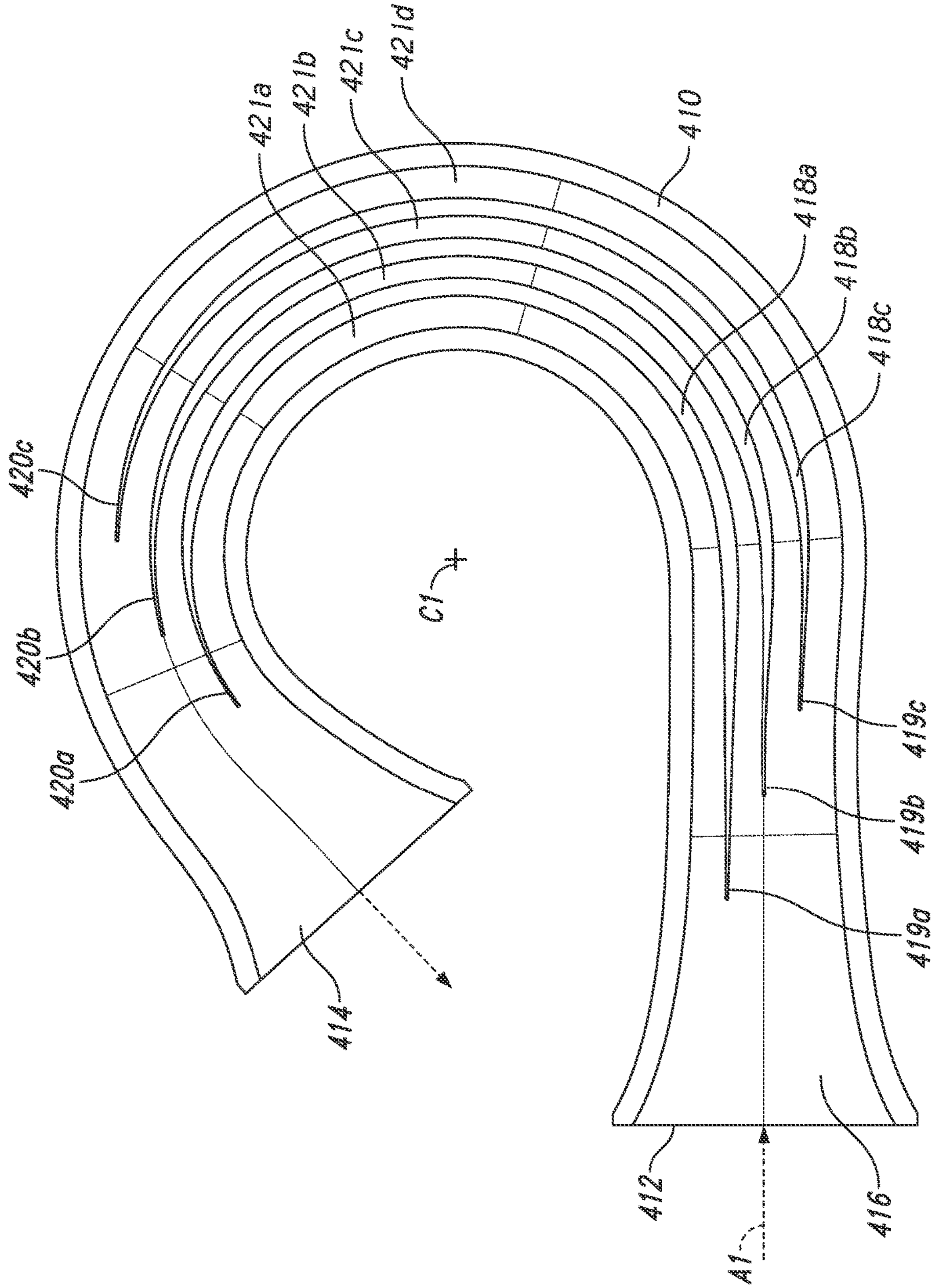
FIG. 4C is a top sectional view of the acoustic port from FIG. 4A.

FIG. 4A is perspective view of an acoustic port 450, FIG. 4B is a perspective sectional view of the acoustic port 450, and 4C is a top sectional view of the acoustic port 450. The acoustic port 450 can include a wall 410 that defines the body of the acoustic port 450. A first aperture 412 can be positioned at one end of the wall 410 and a second aperture 414 can be positioned at the second end of the wall 410. The wall 410, first aperture 412, and second aperture 414 can form a passageway 416 within the acoustic port 450 through which air (or another suitable fluid) can flow. In some examples, air flows through the passageway 416 from the first aperture 412 toward the second aperture 414. Within the passageway 416, the port 450 can include a first vane 418*a*, a second vane 418*b*, and a third vane 418*c*. The first vane 418*a*, second vane 418*b*, and third vane 418*c* (collectively "the vanes 418") can couple to the wall 410 and extend into the passageway 416 (e.g., extending from an interior surface of the wall 410 and into a radially central region of the passageway 416). In some examples, the passageway 416 can take the form of a chamber, lumen, flow path, or other suitable structure through which air can flow. The vanes 418 can divide part or all of the passageway 416 into two or more channels 421. For example, as illustrated in FIGS. 4A-4C, the first vane 418*a*, second vane 418*b*, and third vanes 418*c* divide part of the passageway 416 into four channels 421*a*, 421*b*, 421*c*, and 421*d*. In some examples, air flowing within the passageway 416 can be divided by the vanes 418 and flow through one or more of the channels 421*a-d*. In some examples, the channels 421 can each take the form of a chamber, lumen, flow path, or other suitable structure through which air can flow.

The wall 410 can be curved along an axial direction so that the body of the acoustic port 450 has a curved profile. The curved wall 410 can result in the passageway 416 having a curved section or sections along at least a portion of the passageway 416. For example, as illustrated in FIG. 4C, the axis A1 extending through the center of the passageway 416 is not straight along at least a portion of the length of the passageway. In various examples, the wall 410 curves in the axial direction about a center of curvature Cl. In some examples, substantially all of the wall 410 is curved so that entire body of the acoustic port 450 has a curved profile. In various examples, some sections of the wall 410 are not curved. For example, the wall 410 can have a section of the wall 410 that is substantially straight along the axial direction while a separate section of the wall 410 is at least partially curved along the axial direction. In some examples, the wall 410 is not curved and has a substantially straight profile. In various examples, the wall 410 curves by greater than 90 degrees along the axial direction. For example, the wall 410 can have a curve about (e.g. plus or minus 10%, 5%, 1%, or less than 1%) 135 degrees, 180 degrees, 225 degrees, 270 degrees, or 315 degrees. In some examples, the wall 410 can curve beyond 360 degrees and form a spiral. The curvature of the wall 410 can orient the first aperture 412 and second aperture 414 in a non-parallel manner. For example, as illustrated in FIGS. 4A-4C, the first aperture 412 is oriented along a first plane and the second aperture 414 is oriented along a second plane that would intersect the first plane.

The vanes 418 can each have a first end 419 and a second end 420 with a body extending between the first end 419 and second end 420. In some examples, the vanes 418 do not have a uniform thickness. For example, as illustrated in FIGS. 4A-4C, the vanes 418 can be tapered near the first end 419 and second end 420 so that the vanes 418 have a smaller thickness at the first end 419 and second end 420 than in the central body portion. Tapering the first ends 419 and second ends 420 of the vanes 418 can reduce the drag the vanes 418 exert on air flowing through the passageway 416 and can decrease the turbulence generated at the interface of inflowing or outflowing air at the ends 419 and 420 of the vanes 418. The vanes 418 can extend along a portion of the axial length of the acoustic port 450. For example, as illustrated in FIGS. 4A-4C, the vanes 418 are spaced apart from the first aperture 412 and second aperture 414 so that the first ends 419*a-c* of the vanes 418 are located proximate the first aperture 412 and that the second ends 420*a-c* are located proximate the second aperture 414. Accordingly, the axial length of the vanes 418 can be shorter than the axial length of the acoustic port 450. In various examples, the vanes 418 can extend along the entire length of the acoustic port 450. In some examples, the length of the vanes 418 can be shorter than the length of the passageway 416. In various examples, the vanes 418 can have different lengths. For example, the first vane 418*a* can be longer than the second vane 418*b*, which can be longer than the third vane 418*c*. In some examples, the first ends 419, second ends 420, or both the first ends 419 and second ends 420 of the vanes 418 can be spaced apart from each other along the axial direction. For example, as illustrated in FIGS. 4A-4C, the first end 419*c* is axially spaced apart from the first end 419*b*, which is axially spaced apart from the first end 419*a*. In some examples, some vanes 418 can be positioned closer to the first aperture 412, second aperture 414, or both the first aperture 412 and second aperture 414 than the other vanes 418.

In various examples, the acoustic port 450 can have one or more vanes 418. For example, as illustrated in FIGS. 4A-4C, the acoustic port 450 can have three vanes 418. In some examples, the acoustic port 450 can have a different number of vanes 418. For example, the acoustic port 450 can have one, two, four, five, six, seven, eight, nine, ten, or more vanes 418. The vanes 418 can be spaced apart from one another along a radial direction (e.g. a direction that is perpendicular to the flow of air, a direction that is perpendicular or orthogonal to the axial direction, and/or a direction that is extending outwards from a center of curvature). For example, as illustrated in FIG. 4C, the first vane 418*a* can be disposed nearer to the center of curvature Cl than the second vane 418*b* and third vane 418*c*. In some examples, the vanes 418 are spaced apart from one another along the radial direction by substantially the same distance. In various examples, the vanes 418 are spaced apart from one another along the radial direction by different distances. In some examples, the lengths and widths of the channels 421 (as defined by the vanes 418) can be configured such that the cross-sectional area and/or total volume of each of the channels 421 are substantially the same. In other examples, the cross-sectional area and/or total volume of two or more of the channels 421 can vary from one another.

In some examples, the vanes 418 can be substantially parallel to one another along the axial direction. Additionally or alternatively, some or all of the vanes 418 can extend along the passageway 416 along a direction substantially parallel to the wall 410 of the port 450. As such, the channels 421 defined by the vanes 418 can have widths or cross-sectional areas that are substantially constant along at least a portion of the lengths of the vanes 418. In various examples, the vanes 418 are not substantially parallel to one another along the axial direction.

As noted previously, the channels 421 can be formed within the passageway 416. The channels 421 can be defined by the space between the walls 410 and the vanes 418. For example, as illustrated in FIGS. 4A-4C, the first channel 421*a* can be defined by the space between the wall 410 and the first vane 418*a*, and the second channel 421*b* can be defined by the space between the wall 410, the first vane 418*a*, and the second vane 418*b*. In some examples, the channels 421 can have an axial length that is defined by the shortest vane 418 forming the channel 421. For example, in reference to FIG. 4C, the first channel 421*a* can have an axial length that is equal to the length of the first vane 418*a*, the second channel 421*b* can have an axial length that is equal to the length of the second vane 418*b*, and the third channel 421*c* and fourth channel 421*d* can have an axial length that is equal to the length of the third vane 418*c*. In some examples, the channels 421 can have different lengths. For example, as illustrated in FIGS. 4A-4C, the first channel 421*a* can be longer than the second channel 421*b*, which is longer than the third channel 421*c* and fourth channel 421*d*. In some examples, the channels 421 have substantially the same length. In various examples, the channels 421 can have substantially the same cross-sectional area. For example, the vanes 418 can be evenly spaced along the radial direction so cross-sectional areas of the channels 421 are substantially the same. In some examples, the cross-sectional areas of the channels 421 can be different.

In various examples, the acoustic port 450 can have any suitable number of channels 421. For example, the acoustic port 450 can have two, three, five, six, seven, eight, nine, ten, eleven, or more channels. In some examples, the acoustic port 450 comprises no channels within the passageway 416.

In some examples, the passageway 416 does not have a uniform thickness. For example, as illustrated in FIGS. 4A-4C, the passageway 416 can be wider along the radial direction at the first aperture 412 and second aperture 414 than at the sections between the first aperture 412 and second aperture 414. In various examples, the passageway 416 has a uniform thickness along the axial length of the vanes 418. In some examples, the passageway 416 continuously narrows from the first aperture 412 to the first end 419 of the vane so that the width of the passageway 416 at the first end 419 of the vane 418 is narrower than the width of the passageway 416 at the first aperture 412.

During operation of the playback device, the vanes 418 can reduce turbulence of airflow within the passageway 416. The vanes can separate the airflow within the passageway 416 so the airflow is divided and flows into the separate channels 421. Because the individual channels 421 each have a smaller cross-sectional area than the entirety of the passageway 416, the airflow within the individual channels 421 exhibits flow characteristics that are more uniform and laminar compared to airflow within a passageway 416 without any vanes 418. With more uniform and laminar airflow, unwanted noise within the acoustic port 450 can be reduced, minimized, or eliminated. Accordingly, the vanes 418 can reduce noise caused by the turbulence associated with air flow through a curved acoustic port 450.

Figure 5:
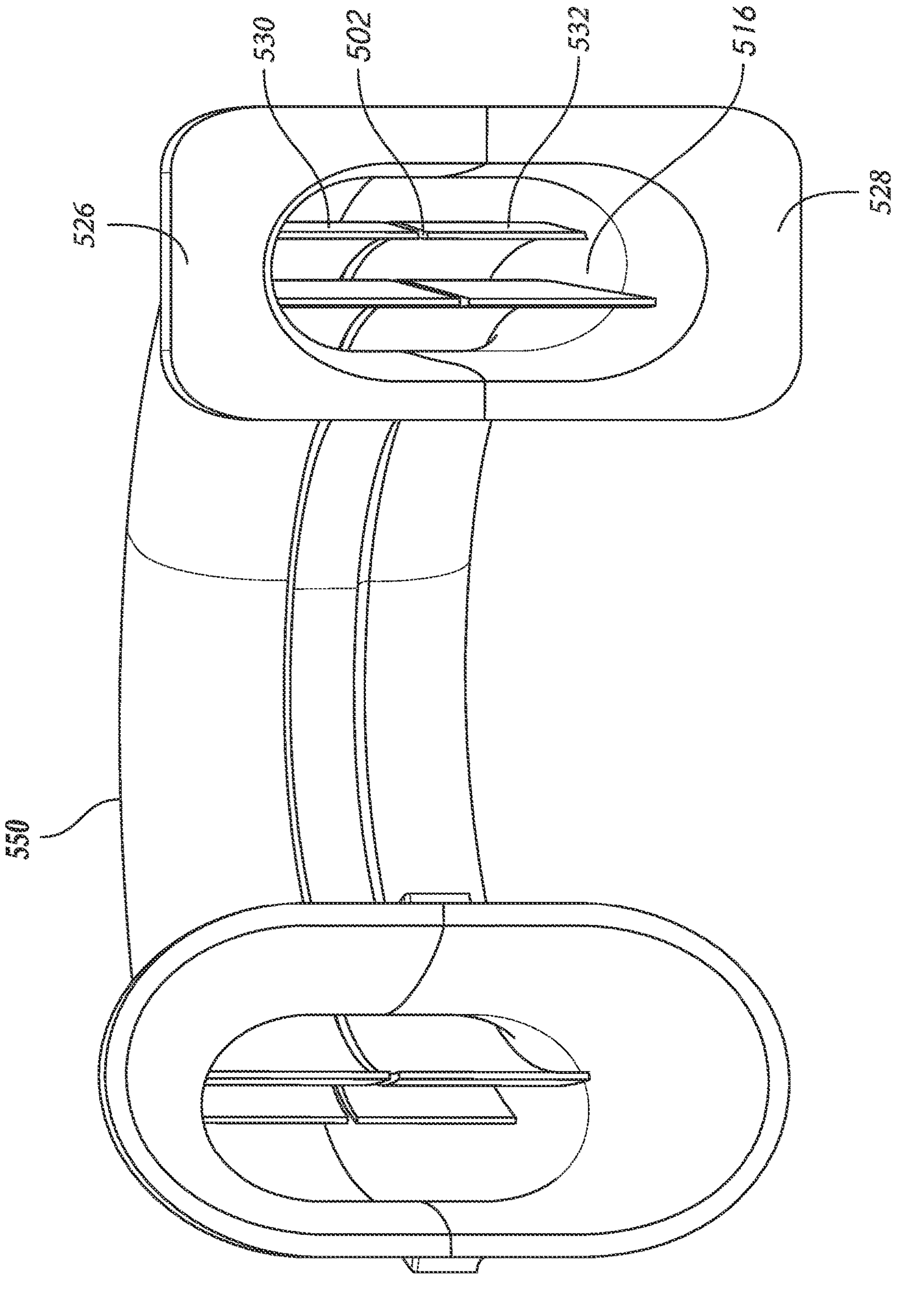
FIG. 5 a front isometric view of an acoustic port in accordance with examples of the disclosed technology.

FIG. 5 is a perspective view of an acoustic port 550. In some examples, the acoustic port 550 can be similar to the acoustic port 450 and the acoustic port 350 by having similar components and functioning in a similar manner. The acoustic port 550 can include an upper portion 526 and a lower portion 528. The upper portion 526 can couple with the lower portion 528 to form a passageway 516 similar to the passageway 416. One or more upper vanes 530 can be coupled to the upper portion 526. The upper vanes 530 can extend from the upper portion 526 and into the passageway 516. One or more vanes 532 can be coupled to the lower portion 528. The lower vanes 532 can extend from the lower portion 528 and into the passageway 516. In some examples, the upper vanes 530 and lower vanes 532 can be spaced apart radially from the upper portion 526 and lower portion 528 so that the upper vanes 530 and lower vanes 532 align. In various examples, the upper vanes 530 and lower vanes 532 can function as single vane (e.g. the upper vane 530 and lower vane 532 can define one or channels). In some examples, the upper vane 530 and lower vane 532 have a gap 502 formed between the upper vane 530 and lower vane 532. In various example, the presence of a gap 502 between the upper vane 530 and lower vane 532 does not impact the overall effectiveness of reducing unwanted noise within the acoustic port 550 due to the curvature of the acoustic port 550.

In some instances, the vertical gap 502 between the upper vane 530 and the lower vane 532 can facilitate manufacturing and assembly of the completed port 550. For example, a lower portion (including the lower vane 532) can be separately formed (e.g., using injection molding, casting, or other suitable technique) and mated with a separately formed upper portion (including the upper vane 502). By including a vertical gap 502, the upper and lower portions can be mated together even if small defects or manufacturing irregularities are present along the mating surfaces of the upper and lower portions.

Figure 6:
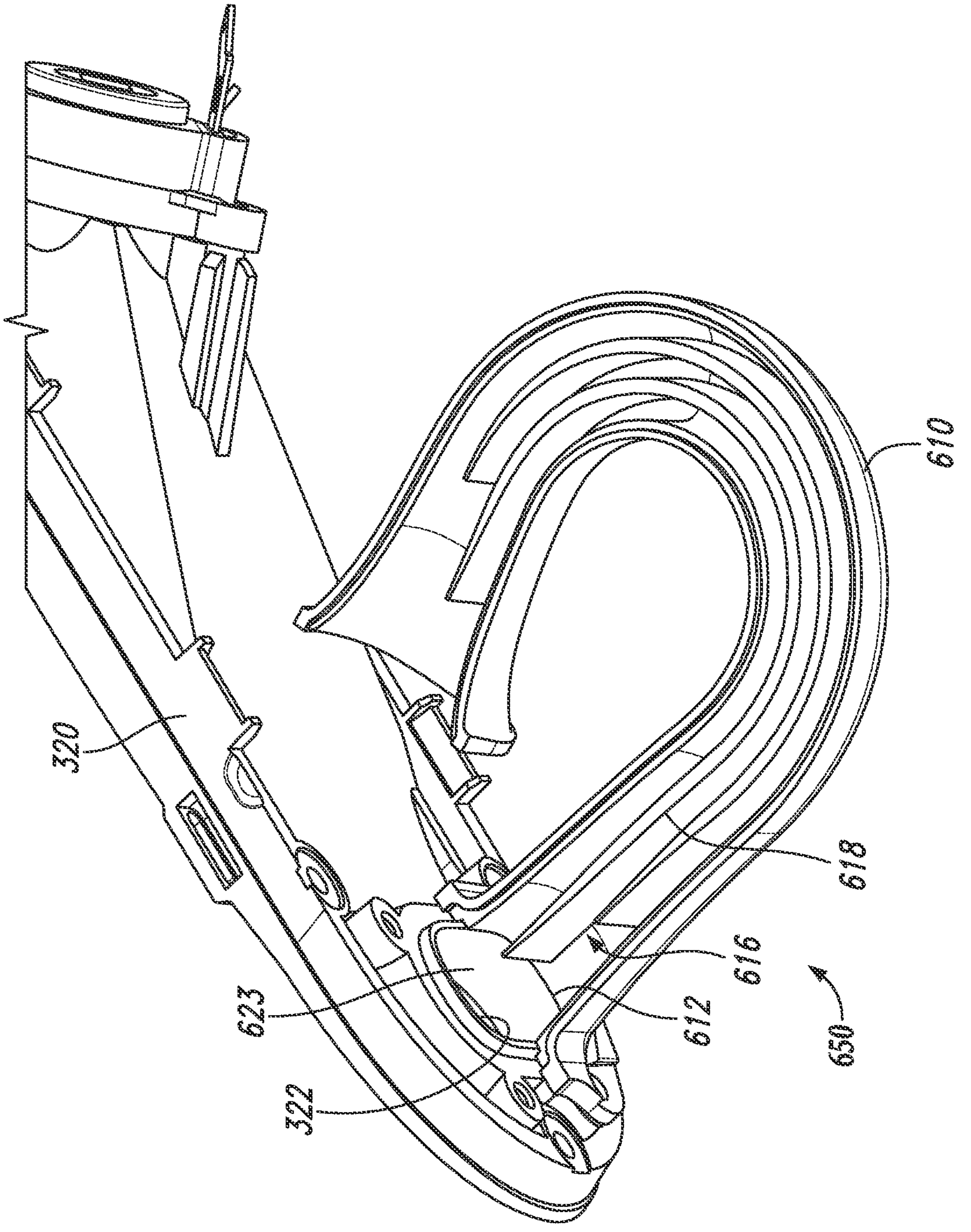
FIG. 6 a rear isometric view of an acoustic port coupled to a frame in accordance with examples of the disclosed technology.

FIG. 6 is a perspective view of an acoustic port 650 coupled to the frame 320 of the playback device. In some examples, the acoustic port 650 can be similar to the acoustic port 550, the acoustic port 450, and the acoustic port 350 by having similar components and functioning in a similar manner. The frame 320 can have an acoustic wall 623. The acoustic wall 623 can be positioned on the frame 320 so that the acoustic wall 623 aligns with the acoustic port 650 when the acoustic port 650 couples to the frame 320. The acoustic wall 623 can function as an extension of the acoustic port 650. For example, the acoustic wall 623 can form part of the passageway 616, with the passageway 616 being similar to the passageway 516 and passageway 416. In some examples, a vane 618 can couple to the acoustic wall 623 and extend into the passageway 616. In various examples, the vane 618 can couple to both the acoustic wall 623 and the wall 610 of the acoustic port 650. By forming an acoustic wall 623 within the frame 320, the acoustic port 650 can be designed in a more compact manner, as the acoustic wall 623 can account for part of the effective length of the overall acoustic port 650.

III. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to “example” means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A playback device comprising: a housing defining an acoustic volume therein; one or more audio transducers disposed at least partially within the housing; and an acoustic port extending through the housing, the acoustic port comprising: a wall defining a first aperture, a second aperture, and a passageway extending therebetween, the wall being at least partially curved along an axial direction; and a plurality of vanes coupled to the wall and extending into the passageway such that the vanes define a plurality of channels extending axially within the passageway.

Example 2. The playback device of claim 1, wherein the plurality of vanes extend substantially parallel to one another along the axial direction.

Example 3. The playback device of any one of the proceeding Examples, wherein the plurality of channels have substantially identical cross-sectional areas taken along a radial direction orthogonal to the axial direction.

Example 4. The playback device of any of the preceding Examples, wherein the plurality of channels have substantially equal lengths along the axial direction.

Example 5. The playback device of any of the preceding Examples, wherein the plurality of vanes have different lengths along the axial direction.

Example 6. The playback device of any of the preceding Examples, wherein the plurality of vanes extend axially along only a portion of a length of the passageway.

Example 7. The playback device of any of the preceding Examples, wherein each of the plurality of vanes extends between a first end proximate the first aperture and a second end proximate the second aperture, and wherein the first ends of the plurality of vanes are offset from one another in the axial direction.

Example 8. The playback device of Example 7, wherein the wall curves in the axial direction about a center of curvature, wherein the plurality of vanes includes a first vane and a second vane having corresponding first ends, and wherein the first vane is disposed nearer to the center of curvature than is the second vane, and wherein the first end of the first vane is positioned nearer to the first aperture than the first end of the second vane.

Example 9. The playback device of any of the preceding Examples, wherein each of the plurality of vanes extends between a first end proximate the first aperture and a second end proximate the second aperture, and wherein the second ends of the plurality of vanes are offset from one another in the axial direction.

Example 10. The playback device of Example 9, wherein the wall curves in the axial direction about a center of curvature, wherein the plurality of vanes includes a first vane and a second vane having corresponding first ends and second ends, and wherein the first vane is disposed nearer to the center of curvature than is the second vane, and wherein the second end of the first vane is positioned nearer to the second aperture than the second end of the second vane.

Example 11. The playback device of any of the preceding Examples, wherein each of the plurality of vanes extends between a first end portion proximate the first aperture and a second end portion proximate the second aperture, and wherein a thickness of each of the vanes tapers from a first thickness at the first and second end portions to a second thickness.

Example 12. The playback device of any of the preceding Examples, wherein the wall curves along the axial direction by greater than 90 degrees.

Example 13. The playback device of any of the preceding Examples, wherein the first aperture is oriented along a first plane and the second aperture is oriented along a second plane that intersects the first plane.

Example 14. The playback device of any of the preceding Examples, wherein an axial axis extending through a center of the passageway is not straight along at least a portion of the length of the passageway.

Example 15. A playback device comprising: a housing defining an interior volume therein; an audio transducer disposed at least partially within the housing; and a tube extending through the housing, the tube comprising: a wall defining a first aperture, a second aperture, and a passageway extending axially between the first aperture and the second aperture, the wall being at least partially curved or bent along the axial direction; and a vane coupled to the wall and extending into the passageway such that the vane defines a first channel and a second channel within the passageway.

Example 16. The playback device of Example 15, wherein the vane is a first vane, the tube further comprising a second vane coupled to the wall and extending into the passageway, the second vane being spaced apart from the first vane such that the second vane defines a third channel within the passageway.

Example 17. The playback device of Example 16, wherein the first vane is longer in the axial direction than the second vane.

Example 18. The playback device of Examples 16 or 17, wherein the first vane and second vane extend substantially parallel to one another along the axial direction.

Example 19. The playback device of any of the Examples 16-18, wherein the first channel, second channel, and third channel have substantially identical cross-sectional areas taken along a direction orthogonal to the axial direction.

Example 20. The playback device of any of the Examples 16-19, wherein the first channel, second channel, and third channel have substantially equal lengths along the axial direction.

Example 21. The playback device of any of the Examples 16-20, wherein the first vane and second vane have different lengths along the axial direction.

Example 22. The playback device of any of the Examples 16-21, wherein the first vane and second vane extend axially along only a portion of a length of the passageway.

Example 23. The playback device of any of the Examples 16-22, wherein each of the first vane and second vane extend between a first end proximate the first aperture and a second end proximate the second aperture, and wherein the first ends of the first and second vanes are offset from one another in the axial direction.

Example 24. The playback device of Example 23, wherein the wall curves in the axial direction about a center of curvature, and wherein a first vane disposed nearer to the center of curvature has a first end positioned nearer the first aperture than a second vane disposed further from the center of curvature.

Example 25. The playback device of any of the Examples 16-24, wherein each of the first vane and second vane extend between a first end proximate the first aperture and a second end proximate the second aperture, and wherein the second ends of the first and second vanes are offset from one another in the axial direction.

Example 26. The playback device of Example 25, wherein the wall curves in the axial direction about a center of curvature, and wherein a first vane disposed nearer to the center of curvature has a second end positioned nearer the interior aperture than a second vane disposed further from the center of curvature.

Example 27. The playback device of any of the Examples 16-26, wherein each of the first vane and second vane extend between a first end portion proximate the first aperture and a second end portion proximate the second aperture, and wherein a thickness of each of the vanes tapers at the first and second end portions.

Example 28. The playback device of any of the Examples 15-27, wherein the wall curves along the axial direction by greater than 90 degrees.

Example 29. The playback device of any of the Examples 15-28, wherein the first aperture is oriented along a first plane and the second aperture is oriented along a second plane that intersects the first plane.

Example 30. The playback device of any of the Examples 15-29, wherein a axial axis extending through a center of the passageway is not straight along at least a portion of the length of the passageway.

Example 31. The playback device of any of the Examples 15-30, wherein the vane comprises a first portion, a second portion, and a gap between the first and second portion.

Example 32. A port comprising: an outer wall defining a chamber, a first opening at a first end, a second opening at a second end, and a length extending axially between the first and second end, the outer wall having a curve or bend in the axial direction along at least a portion of the length; and a vane extending from the outer wall the chamber that at least partially divides the chamber into a first chamber portion and a second chamber portion, the vane having a first end, a second end, and an intermediate portion therebetween.

Example 33. The port of Example 32, wherein the vane is a first vane, the port further comprising a second vane coupled to the outer wall and extending into the chamber, the second vane being spaced apart from the first vane, the second vane having a first end, a second end, and an intermediate portion therebetween, wherein the length of the second vane is smaller than the length of the chamber.

Example 34. The port of Example 33, wherein the first end of the first vane is closer to the first end of the chamber than the first end and second end of the second vane.

Example 35. The port of Examples 33 or 34, wherein the length of the first vane is longer than the length of the second vane.

Example 36. The port of any of the Examples 33-35, wherein the first vane and second vane are about parallel.

Example 37. The port of any of the Examples 32-36, wherein the first end and second end of the vane are tapered.

Example 38. The port of any of the Examples 32-37, wherein the outer wall narrows such that the width of the chamber at the first end of the vane is narrower than the width of the chamber at the first end of the chamber.

Example 39. The port of any of the Examples 32-38, wherein the vane comprises a first portion, a second portion, and a gap between the first portion and second portion.

Example 40. The port of any of the Examples 32-39, wherein the length of the vane is smaller than the length of the chamber.

Example 41. The port of any of the Examples 32-40, wherein the vane reduces noise caused by turbulence within the chamber.

The invention claimed is:

1. A playback device comprising:

a housing defining an acoustic volume therein;

one or more audio transducers disposed at least partially within the housing; and an acoustic port extending through the housing, the acoustic port comprising:

a wall defining a first aperture, a second aperture, and a passageway extending therebetween, the wall being at least partially curved along an axial direction; and a plurality of vanes coupled to the wall and extending into the passageway such that the vanes define a plurality of channels extending axially within the passageway, wherein each of the plurality of vanes extends between a first end proximate the first aperture and a second end proximate the second aperture, and wherein the first ends of the plurality of vanes are offset from one another in the axial direction.

2. The playback device of claim 1, wherein the wall curves in the axial direction about a center of curvature, wherein the plurality of vanes includes a first vane and a second vane having corresponding first ends, and wherein the first vane is disposed nearer to the center of curvature than is the second vane, and wherein the first end of the first vane is positioned nearer to the first aperture than the first end of the second vane.

3. The playback device of claim 1, wherein the second ends of the plurality of vanes are offset from one another in the axial direction.

4. The playback device of claim 3, wherein the wall curves in the axial direction about a center of curvature, wherein the plurality of vanes includes a first vane and a second vane having corresponding first ends and second ends, and wherein the first vane is disposed nearer to the center of curvature than is the second vane, and wherein the second end of the first vane is positioned nearer to the second aperture than the second end of the second vane.

5. The playback device of claim 1, wherein the wall curves along the axial direction by greater than 90 degrees.

6. A playback device comprising:

a housing defining an acoustic volume therein;

one or more audio transducers disposed at least partially within the housing; and an acoustic port extending through the housing, the acoustic port comprising:

a wall defining a first aperture, a second aperture, and a passageway extending therebetween, the wall being at least partially curved along an axial direction; and a plurality of vanes coupled to the wall and extending into the passageway such that the vanes define a plurality of channels extending axially within the passageway, wherein each of the plurality of vanes extends between a first end portion proximate the first aperture and a second end portion proximate the second aperture, and wherein a thickness of each of the vanes tapers from a first thickness at the first and second end portions to a second thickness.

7. A playback device comprising:

a housing defining an interior volume therein;

an audio transducer disposed at least partially within the housing; and a tube extending through the housing, the tube comprising:

a wall defining a first aperture, a second aperture, and a passageway extending axially between the first aperture and the second aperture, the wall being at least partially curved or bent along the axial direction;

a first vane coupled to the wall and extending into the passageway such that the first vane defines a first channel and a second channel within the passageway; and a second vane coupled to the wall and extending into the passageway, the second vane being spaced apart from the first vane such that the second vane defines a third channel within the passageway.

8. The playback device of claim 7, wherein the first vane is longer in the axial direction than the second vane.

9. The playback device of claim 7, wherein each of the first vane and second vane extend between a first end proximate the first aperture and a second end proximate the second aperture, and wherein the first ends of the first and second vanes are offset from one another in the axial direction.

10. The playback device of claim 9, wherein the wall curves in the axial direction about a center of curvature, and wherein a first vane disposed nearer to the center of curvature has a first end positioned nearer the first aperture than a second vane disposed further from the center of curvature.

11. The playback device of claim 7, wherein each of the first vane and second vane extend between a first end proximate the first aperture and a second end proximate the second aperture, and wherein the second ends of the first and second vanes are offset from one another in the axial direction.

12. The playback device of claim 11, wherein the wall curves in the axial direction about a center of curvature, and wherein a first vane disposed nearer to the center of curvature has a second end positioned nearer the second aperture than a second vane disposed further from the center of curvature.

13. The playback device of claim 7, wherein each of the first vane and second vane extend between a first end portion proximate the first aperture and a second end portion proximate the second aperture, and wherein a thickness of each of the vanes tapers at the first and second end portions.

14. A port comprising:

an outer wall defining a chamber, a first opening at a first end, a second opening at a second end, and a length extending axially between the first and second end, the outer wall having a curve or bend in the axial direction along at least a portion of the length;

a first vane extending from the outer wall into the chamber that at least partially divides the chamber into a first chamber portion and a second chamber portion, the first vane having a first end, a second end, and an intermediate portion therebetween; and a second vane coupled to the outer wall and extending into the chamber, the second vane being spaced aprt from the first vane, the second vane having a first end, a second end, and an intermediate portion therebetween, wherein the length of the second vane is smaller than the length of the chamber, and wherein the first end of the first vane is closer to the first end of the chamber than the first end and second end of the second vane.

15. The port of claim 14, wherein the first end and second end of the first vane are tapered.

16. The port of claim 14, wherein the outer wall narrows such that the width of the chamber at the first end of the vane is narrower than the width of the chamber at the second end of the chamber.

* * * * *